United States Patent [19]

Umezawa

[11] Patent Number: 4,890,966
[45] Date of Patent: Jan. 2, 1990

[54] SECURING CLIP

[75] Inventor: Takashi Umezawa, Sagamihara, Japan

[73] Assignee: Nifco, Inc., Yokohama, Japan

[21] Appl. No.: 227,854

[22] Filed: Aug. 3, 1988

[30] Foreign Application Priority Data

Aug. 7, 1987 [JP] Japan .................. 62-121328

[51] Int. Cl.$^4$ .............................................. F16B 21/00
[52] U.S. Cl. ...................... 411/340; 411/908; 411/182; 411/57; 24/289; 24/297; 24/453
[58] Field of Search ................ 24/289–292, 24/297, 453; 52/511, 718; 411/40, 41, 57, 60, 173, 177, 182, 183, 340, 908

[56] References Cited

U.S. PATENT DOCUMENTS

| | | | |
|---|---|---|---|
| 2,404,169 | 7/1946 | Gidden | 411/340 |
| 3,728,761 | 4/1973 | Holly | 411/57 |
| 4,022,100 | 5/1977 | Johnson | 411/57 |
| 4,499,636 | 2/1985 | Tanaka | 24/289 |
| 4,662,808 | 5/1987 | Camilleri | 411/340 |
| 4,780,037 | 10/1988 | Payne | 411/908 X |
| 4,782,562 | 11/1988 | Yuta | 24/289 X |

FOREIGN PATENT DOCUMENTS 819041  6/1937  France .................. 411/60

Primary Examiner—Gary L. Smith
Assistant Examiner—Douglas E. Ringel
Attorney, Agent, or Firm—Schwartz & Weinrieb

[57] ABSTRACT

A plastic clip for securing a panel or like member to a stud or like securement member is disclosed. The clip comprises a first member having a head portion having a through hole and a pair of locking portions extending from the head portion and capable of being pivoted relative to the head portion and a second member having an insertion portion to be inserted through the through hole and a locking portion to be locked to the securement member. By inserting the insertion portion of the second member into the through hole of the first member after insertion of the pair of locking portions of the first member through a mounting hole of the member to be secured, the pair of locking portions are pivoted away from each other so as to clamp the member to be secured. In this state, the locking portion of the second member is secured to the securement member, thus securing the member to be secured to the securement member.

15 Claims, 2 Drawing Sheets

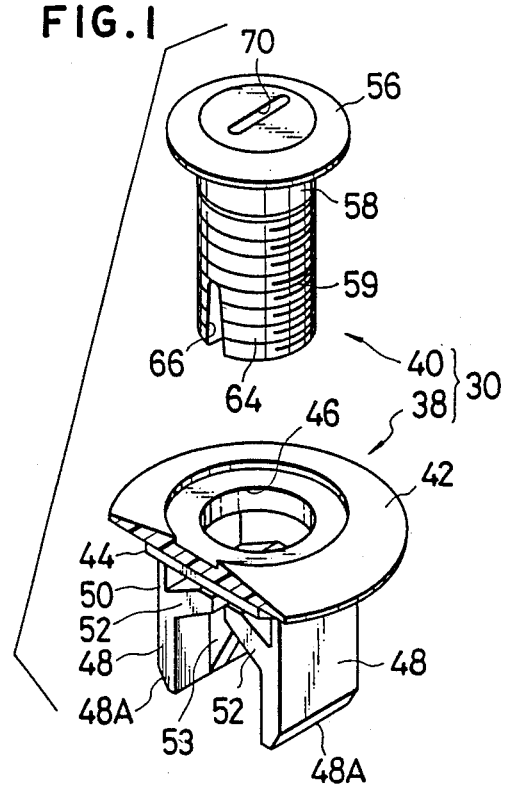
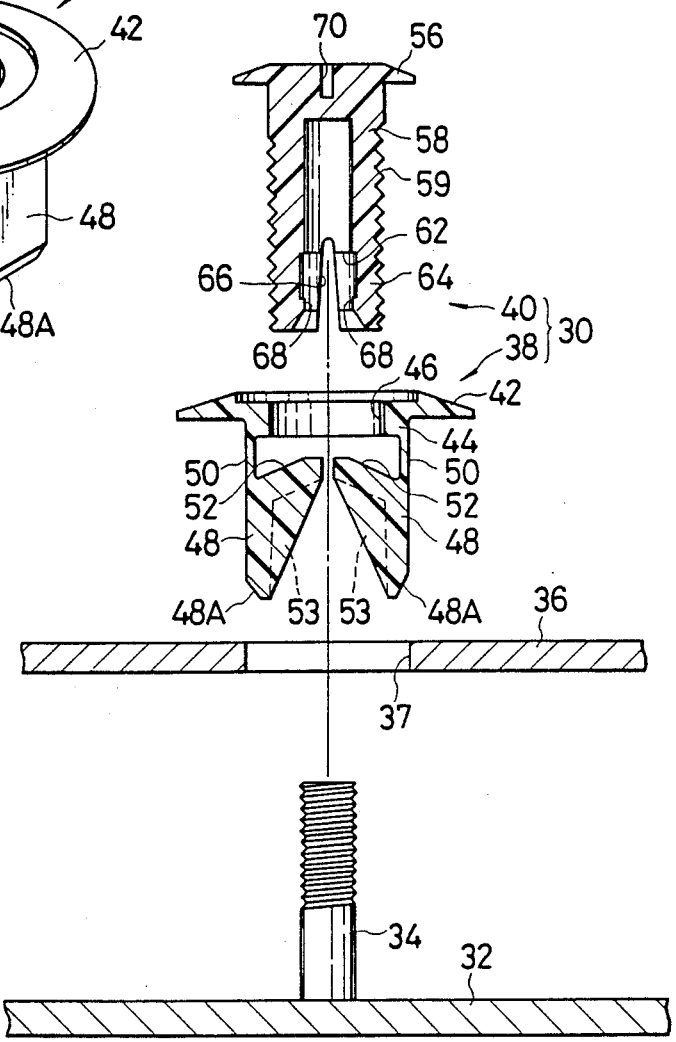

SECURING CLIP

FIELD OF THE INVENTION

This invention relates to a clip for securing a member to be locked to a securement member, such as, for example, a stud.

DESCRIPTION OF THE PRIOR ART

In automobiles, clips are used for mounting such members as rear finishers and trim boards.

FIG. 4 shows a typical well-known clip. The illustrated clip 10 has a thin disk-like head portion 12 and a cylindrical portion 14 projecting downwardly from the under side of the head portion 12. The inner periphery of the cylindrical portion 14 is formed with pawls 16. To use this clip 10, the cylindrical portion 14 is inserted from its end through a mounting hole 19 formed within a panel 18. As the cylindrical portion 14 is inserted, a stud 20 is inserted through it thereby causing elastic deformation of the pawls 16 inwardly of the cylindrical portion 14. The pawls 16 mesh with a thread of the stud 20, whereby the clip 10 is locked to the stud 20. In this way, the panel 18 is mounted with the head portion 12 of the clip acting as a retainer.

With this clip 10, however, when the mounted panel 18 experiences a strong force in the direction shown by means of the arrow in FIG. 4, it is displaced to a position as shown by means of the phantom line in FIG. 4. To prevent such displacement of the panel 18, it is necessary to provide separate means for preventing the displacement.

OBJECT OF THE INVENTION

An object of the invention is to provide a clip, which can prevent the displacement of a mounted panel or a like member so that the panel or the like is reliably secured.

SUMMARY OF THE INVENTION

To attain the above object of the invention, there is provided a clip which comprises a first member and a second member, the first member having a head portion for contact with the surface of a member to be secured, a through hole formed within the head portion and a pair of locking portions extending from the head portion and capable of being pivoted radially outwardly relative to the head portion so as to clamp the member to be secured in cooperation with the head portion, the second member having an insertion portion to be inserted through the through hole of the first member and a locking portion for locking a securement member to the insertion portion, the pair of locking portions and insertion portion being provided with complementary locking means for coupling the two in a clamping relationship with respect to the member to be secured when the insertion portion is inserted into the through hole.

With the clip of the above construction, by inserting the insertion portion of the second member into the through hole of the first member after insertion of the pair of locking portions of the first member through the member to be secured, the pair of locking portions are pivoted radially outwardly away from each other so as to clamp the member to be secured in cooperation with the head portion. In this state, the locking means provided upon the pair of locking portions are complementarily locked to the locking means provided upon the insertion portion of the second member. This locking state is self-maintained. In this state, the insertion portion of the second member is secured to the securement member by means of its locking portion.

As is shown, the member to be secured is clamped between the head portion and the pair of locking portions of the first member, so that the secured member is reliably secured even if a strong force is externally applied to it.

BRIEF DESCRIPTION OF THE DRAWINGS

The above and other objects and features of the invention will become more apparent from the following detailed description with reference to the accompanying drawings, wherein:

FIG. 1 is an exploded perspective view showing an embodiment of the clip according to the invention;

FIG. 2 is an exploded sectional view showing the clip of FIG. 1 before mounting a panel upon a stud;

DETAILED DESCRIPTION OF THE PREFERRED EMBODIMENT

Figure 3:
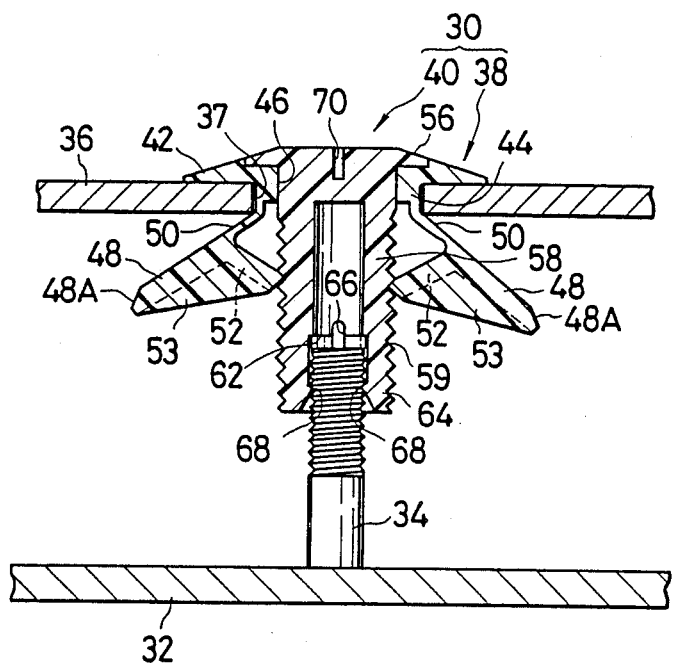
FIG. 3 is a sectional view showing the clip of FIG. 1 after mounting of the panel upon the stud.
Figure 4:
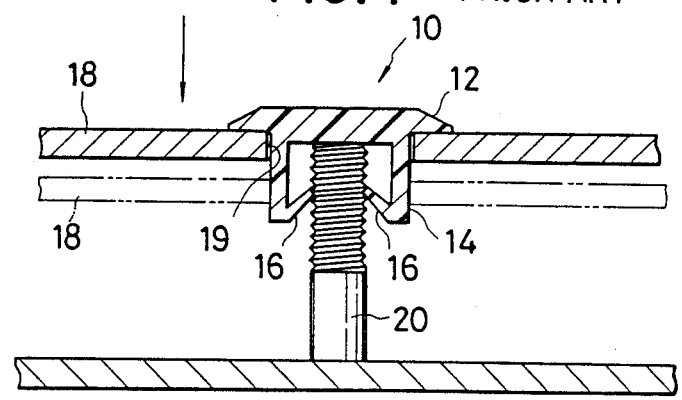
FIG. 4 is a sectional view showing a prior art clip after mounting of a panel upon a stud.

FIGS. 1 to 3 show an embodiment of the clip constructed according to the invention. This embodiment of clip 30, as shown in FIG. 3, is used for mounting a panel 36 in a locked state upon a stud 34 which projects upwardly from a base plate 32. As shown in FIG. 2, the panel 36 is disposed above the free end of the stud 34, and in this state it is mounted upon the stud 34 by means of clip 30. The panel 36 is provided with a rectangular clip-mounting hole 37 which is positioned directly above the stud 34.

The clip 30, as shown in FIGS. 1 and 2, consists of first and second members 38 and 40 which are respective plastic moldings.

The first member 38 has a radially outwardly tapering beveled head portion 42, and in use it is inserted through the mounting hole 37 formed within the panel 36 until the under surface of the head portion 42 is brought into contact with the upper surface of the panel 36. The head portion 42 has an axial through hole 46. A short rectangular cylindrical portion 44 extends coaxially from the under surface of the head portion 42. The rectangular cylindrical portion 44 is inserted in and occupies the mounting hole 37 of the panel 36 so as to prevent rotation of the first member 38 with respect thereto.

The hole 46 penetrates the head portion 42 and short rectangular cylindrical portion 44, and the second member 40 is inserted through the hole 46. The first member 38 has a pair of locking portions 48 which project downwardly from the short rectangular cylindrical portion 44 upon opposite sides of the hole 46 so as to face each other. The locking portions 48 have respective tapered ends 48A which guide the locking portions 48 as they are inserted through the mounting hole 37 of the panel 36 to the under side of the panel 36.

The pair of locking portions 48 have respective reduced-thickness stem portions 50 united to the short rectangular cylindrical portion 44. They can be pivoted with respect to the head portion 42 and away from each other as a result of the deformation of the reduced-thickness stem portions 50 so as to clamp the panel 36 between the head portion 42 and themselves, as shown in FIG. 3. The locking portions 48 have their opposed surfaces near the reduced-thickness stem portions 50 provided with respective projections 52 having pointed free ends and constituting first locking means of the first member 38. As shown in FIGS. 1 and 2, the projections 52 project radially inwardly toward the axis of the hole 46 when the locking portions 48 are disposed in a substantially perpendicular state with respect to the head portion 42. Thus, when the second member 40 is inserted into the hole 46, it strikes the projections 52. Each projection 52 and associated locking portion 48 are united by means of a triangular reinforcement rib 53.

The second member 40 has a beveled head portion 56 tapering radially outwardly. It can be inserted into the hole 46 of the first member 38 until the under surface of the head portion 56 engages a seat surface of the hole 46 of the first member 38. The top surface of the head portion 56 is formed with a slit-like groove 70 so that the second member 40 can be turned by means of a screwdriver. The second member 40 has a cylindrical portion 58 coaxially extending from the under surface of the head portion 56 for insertion into the hole 46 of the first member 38. As the cylindrical portion 58 is inserted into the hole 46 of the first member 38, its free end strikes the projections 52 of the first member 38 thereby biasing the projections 52 radially outwardly so as to push the locking portions 48 away from each other as a result of deformation of the reduced-thickness portions 50.

The outer periphery of the cylindrical portion 58 is formed along its entire length, that is, along its axial dimension, with a male thread 59 constituting a second locking means of the second member 40 for meshing with the projections 52 of the first member 38. The inner periphery of the cylindrical portion 58 has a shoulder 62 defined at an axially intermediate portion thereof, as shown in FIGS. 2 and 3, so that the free end portion of the inner periphery of the cylindrical portion 58 has an increased inner diameter. The stud 34 is inserted into the end portion of increased inner diameter of the cylindrical portion 58. The stud insertion portion, as designated at 64, is formed with a pair of axially extending notches 66. The inner diameter of the stud insertion portion 64 can be increased by increasing the width of the slits or notches 66. The second member 40 is also provided at the inlet of the inner periphery of the stud insertion portion 64 with pawls 68 serving as locking portions for meshing with the thread of the stud 34.

Now, the procedure for mounting the panel 36 using the clip 30 will be described.

First, the pair of locking portions 48 of the first member 38 are inserted into the mounting hole 37 of the panel 36. These locking portions 48 are inserted until the head portion 42 comes into contact with the upper surface of the panel 36. When the head portion 42 is in contact with the upper surface of the panel 36, the locking portions 48 penetrate the mounting hole 37 of the panel 36 and project downwardly below the panel 36, and the short rectangular cylindrical portion 44 occupies the hole 37 so as to prevent relative rotation of the first member 38 with respect to the panel 36.

Then the cylindrical portion 58 of the second member 40 is inserted into the hole 46 of the first member 38. The cylindrical portion 58 is inserted until the under surface of its head portion 56 comes into contact with the seat surface of the hole 46. As the cylindrical portion 58 is inserted through the hole 46, it strikes the projections 52 of the first member 38. As it is inserted further, it forces the projections 52 radially outwardly so as to move the locking portions 48 away from each other as a result of deformation of the reduced-thickness stem portions 50. When the under surface of the head portion 56 is in contact with the seat surface of the hole 46, the panel 36 is clamped between the locking portions 48 and the head portion 42 of the first member 38. In this state, the ends of the projections 52 of the first member 38 are in mesh with the male thread 59 of the second member 40, that is, the first and second members 38 and 40 are coupled to each other. In this state, both the first and second members 38 and 40 are mounted upon the panel 36. Thus, even if the panel 36 is carried and transported in this state, the first and second members 38 and 40 are secure from being accidentally detached from the panel 36. Furthermore, since the projections 52 are in mesh with the male thread 59 of the second member 40, the second member 40 is secure from being detached from the first member 38. Subsequently, the stud insertion portion 64 of the second member 40 is held coaxially with respect to the stud 34 and is urged against the stud 34. As a result, the stud 34 is inserted into the stud insertion portion 64 of the second member 40, and the pawls 68 are meshed with the thread of the stud 34, whereby the second member 40 is locked to the stud 34.

Thus, the panel 36 is mounted upon the stud 34 and its base plate 32 by means of the clip 30 as shown in FIG. 3.

In this mounted state of the panel 36, the second member 40 is locked to the stud 34, and the first member 38 is secured to the panel 36 in a clamping relationship with respect thereto and is also locked to the second member 40. Thus, the panel 36 is reliably secured and will not move toward the base plate 32.

In this embodiment, the projections 52 and locking portions 48 are reinforced by means of the ribs 53. Thus, in the mounted state of the panel 36, the panel-clamping force of the first member 38 and the locking force defined between the first and second members 38 and 40 are sufficiently high so as to firmly secure the panel 36 in place.

Furthermore, in this embodiment the top surface of the head portion 56 of the second member 40 is formed with the groove 70 so that the second member 40 can be rotated by means of a screwdriver. Thus, the panel 36 in the mounted state can be readily removed by releasing the locked state defined between the second member 40 and the stud 34 and also the locked state defined between the first and second members 38 and 40 by rotating the second member 40 with a screwdriver and then withdrawing the cylindrical portion 58 of the second member 40 from the hole 46 of the first member 38.

In the above embodiment the panel 36 is mounted upon the stud 34 by means of the clip 30. According to the invention, however, it is also possible to mount a panel or the like upon a securement member other than the stud 34.

As has been described in the foregoing, according to the invention there is provided a clip for securing a member to a stud or similar securement member, in which after insertion of the pair of locking portions of the first member into a mounting hole of the member to be secured, the cylindrical portion of the second member is inserted into the hole of the first member so as to cause the pair of locking portions to be pivoted outwardly away from each other and thus clamp the member to be secured, and in this state the second member is secured to the member to be secured. Therefore, a panel or like member to be secured can be reliably secured to the securement member in such a state as to be safe from detachment from the securement member even if a strong force is externally applied to it.

Obviously, many modifications and variations of the present invention are possible in light of the above teachings. It is therefore to be understood that within the scope of the appended claims, the present invention may be practiced otherwise than as specifically described herein.

What is claimed is:

1. A clip for securing a member to a stud or similar support member, comprising:
    a first member having a head portion for engagement with a first surface of said member to be secured; a through-hole defined within said head portion; radially outwardly expansible locking portions operatively connected to said head portion and engageable with a second surface of said member to be secured when moved to a radially outwardly expanded position so as to cooperate with said head portion whereby said member to be secured is clampingly engaged between said head portion and said locking portions; and first locking means defined upon said locking portions; and
    a second member comprising an insertion portion to be inserted through said through-hole of said head portion of said first member so as to engage said locking portions of said first member and thereby move said locking portions to said radially outwardly expanded position; second locking means defined upon said insertion portion of said second member for lockingly engaging said first locking means of said locking portions of said first member when said insertion portion has been inserted through said through-hole of said head portion of said first member and has engaged said locking portions of said first member so as to move said locking portions to said expanded position, whereby said member to be secured will be lockingly clamped between said head and locking portions of said first member and said first and second members will be locked together; and bore means defined within an end portion of said insertion portion for lockingly receiving said stud-type support member whereby said clip, comprising said first and second members, is able to secure said member to be secured to said stud-type support member.

2. The clip according to claim 1, wherein:
said head portion of said first member includes a short cylindrical portion having one side portion thereof formed so as to have a substantially flattened, squared-off profile.

3. A clip as set forth in claim 1, wherein:
said locking portions comprise a pair of diametrically opposed locking portions.

4. The clip according to claim 3, wherein said first locking means comprises projections provided on opposed surfaces of said pair of locking portions.

5. A clip as set forth in claim 4, wherein:
said projections extend substantially radially inwardly toward each other.

6. The clip according to claim 1, wherein said second locking means is a male thread formed on the outer periphery of said insertion portion.

7. A clip as set forth in claim 6, wherein:
said first locking means of said locking portions comprise locking projections for engaging said male thread formed upon said insertion portion.

8. A clip as set forth in claim 1, further comprising:
slot means defined within said second member for receiving a tool whereby torque may be applied to said second member so as to disengage said male thread of said insertion portion from said locking pawls of said first member.

9. A clip as set forth in claim 1, wherein:
said first locking means of said locking portions comprise locking projections.

10. A clip as set forth in claim 1, wherein:
said stud includes an externally threaded portion; and
said bore means includes pawl means integrally formed upon interior peripheral wall portions of said bore means for lockingly engaging said thread portion of said stud.

11. A clip as set forth in claim 10, further comprising:
slot means defined within said second member for receiving a tool whereby torque can be applied to said second member so as to disengage said pawl means of said insertion portion bore means from said externally threaded portion of said stud.

12. A clip as set forth in claim 1, further comprising:
countersunk recess means defined within said head portion of said first member; and
head means provided upon said second member for reception within said countersunk recess means of said head portion of said first member.

13. A clip as set forth in claim 12, further comprising:
slot means defined within said head means of said second member for receiving a tool whereby torque may be applied to said second member so as to disengage said insertion portion from said stud and said first member.

14. A clip as set forth in claim 1, wherein:
said first and second members comprise plastic moldings.

15. A clip as set forth in claim 1, further comprising:
flexible hinge means integrally connecting each one of said locking portions of said first member to said head portion of said first member so as to permit said locking portions to be movable between normal, non-expanded positions, and said radially outwardly expanded positions.

* * * * *